United States Patent
Kovács et al.

(10) Patent No.: US 10,085,139 B2
(45) Date of Patent: Sep. 25, 2018

(54) METHOD AND APPARATUS FOR TRANSMITTING SELECTED PICTORIAL INFORMATION TO BE DISPLAYED ON AN E-INK TYPE DISPLAY OF A PORTABLE DEVICE

(71) Applicant: Liber8Tech Hungary Kft., Budapest (HU)

(72) Inventors: Zoltán Kovács, Budapest (HU); Gábor Kurucz, Budapest (HU)

(73) Assignee: LIBER8TECH HUNGARY KFT., Budapest (HU)

( * ) Notice: Subject to any disclaimer, the term of this patent is extended or adjusted under 35 U.S.C. 154(b) by 0 days.

(21) Appl. No.: 15/879,657

(22) Filed: Jan. 25, 2018

(65) Prior Publication Data

US 2018/0152823 A1    May 31, 2018

Related U.S. Application Data

(63) Continuation-in-part of application No. PCT/HU2016/000049, filed on Jul. 25, 2016.

(30) Foreign Application Priority Data

Jul. 27, 2015 (HU) ..................... 1500347
Feb. 29, 2016 (HU) ..................... 1600155

(51) Int. Cl.
*G09G 5/00* (2006.01)
*H04W 4/80* (2018.01)
(Continued)

(52) U.S. Cl.
CPC ............ *H04W 4/80* (2018.02); *G09G 3/3618* (2013.01); *G09G 5/00* (2013.01); *H04N 1/00127* (2013.01);
(Continued)

(58) Field of Classification Search
CPC .......... G09G 5/00; G09G 3/00; G09G 3/3618; H04W 4/80; H04W 52/04; H04N 1/00127; H04N 5/38; H04N 5/63
(Continued)

(56) References Cited

U.S. PATENT DOCUMENTS 7,270,276 B2 * 9/2007 Vayssiere ............... G06K 19/06
                                                    235/492
7,429,965 B2 * 9/2008 Weiner ..................... G09G 3/00
                                                    345/30
(Continued)

OTHER PUBLICATIONS

International Search Report for PCT/HU2016/000049 dated Nov. 17, 2016 submitted herewith, 3 pages.
(Continued)

*Primary Examiner* — Trang U Tran
(74) *Attorney, Agent, or Firm* — Fitch, Even, Tabin & Flannery, LLP

(57) ABSTRACT

Method and apparatus for transmitting selected pictorial information present in a host computing device to be displayed on an e-ink type display of a portable device that shows a displayed previous image, wherein the portable device obtains energy supply from the host computing device required for the refreshment of the displayed image, wherein the portable device calculates the energy required for the next refreshment and indicates when in the device sufficient energy is stored, for the calculation of the required energy the timing profile of the portable device is divided into segments, and only the segment of the profile is used which corresponds to the actual parameters required at the time of refreshment, whereby less energy is needed for the refreshment.

14 Claims, 5 Drawing Sheets

(51) Int. Cl.
*H04N 5/63* (2006.01)
*H04N 1/00* (2006.01)
*H04N 5/38* (2006.01)
*G09G 3/36* (2006.01)
*H04W 52/04* (2009.01)

(52) U.S. Cl.
CPC ................ *H04N 5/38* (2013.01); *H04N 5/63* (2013.01); *H04W 52/04* (2013.01)

(58) Field of Classification Search
USPC .................................. 345/204; 348/723, 730
See application file for complete search history.

(56) References Cited

U.S. PATENT DOCUMENTS

| | | | | |
|---|---|---|---|---|
| 7,611,411 B2* | 11/2009 | Griswold et al. | ......... | A63F 9/24 463/29 |
| 7,904,277 B2* | 3/2011 | Ady et al. | ............... | G06F 19/00 702/183 |
| 8,079,904 B2* | 12/2011 | Griswold et al. | ......... | A63F 9/24 463/25 |
| 9,494,609 B2* | 11/2016 | Gelbman et al. | ...... | G01N 35/02 436/47 |
| 9,928,513 B2* | 3/2018 | Huxham et al. | ....... | G06Q 30/00 713/169 |
| 2002/0167500 A1 | 11/2002 | Gelbman | | |

OTHER PUBLICATIONS

Written Opinion of the International Searching Authority (English) for PCT/HU2016/000049, 8 pages.

\* cited by examiner

METHOD AND APPARATUS FOR TRANSMITTING SELECTED PICTORIAL INFORMATION TO BE DISPLAYED ON AN E-INK TYPE DISPLAY OF A PORTABLE DEVICE

CROSS-REFERENCE TO RELATED APPLICATIONS

This application is the U.S. Continuation in Part Application of International Application No. PCT/HU2016/000049, filed Jul. 25, 2016, designating the United States, and claims priority from Hungarian Patent Application No. P1500347, filed Jul. 27, 2015, and from Hungarian Patent Application No. P1600155, filed Feb. 29, 2016, the complete disclosures of which applications are hereby incorporated herein by reference in their entirety for all purposes.

FIELD OF THE INVENTION

The invention relates to a method for transmitting selected pictorial information present in a host computing device to be displayed on an e-ink type display of a portable device that shows a displayed previous image. The invention also relates to an apparatus capable of carrying out the method.

BACKGROUND OF THE INVENTION

In the past decade, the performance of portable computing devices rose dramatically. As a result, the computing capacity of smartphones has become considerable and portable technologies such as smartwatches and smart bracelets have started to conquer the markets.

Techniques of wireless transfer of information and energy have also been worked out, of which NFC and Bluetooth Lowe Energy (BLE) systems represent the most widely used ones.

These techniques have, however, a limitation, namely even if the two devices which communicate with each other using either one of this technique are positioned to the close vicinity of each other, the speed of transferring information and/or energy within a unity time is limited, and the transfer of higher amount of information and energy requires a longer period US publication US2002/0167500 A1 describes a smart electronic label employing electronic ink, wherein the label is a self standing portable device that has an e-ink type display on which information received through a host device can be displayed. The portable device receives energy and data from a host device by one of the aforementioned wireless connections, and the two devices have to be placed close to each other so that the transfer of information and energy can be resolved.

The specialty of e-ink displays lies in that they require energy and input signals only as long as the data to be displayed are transported to the e-ink display, and the new picture replaces the old one, and the display retains the displayed picture as long as a different information is sent to the portable device for being displayed which is controlled to replace the previously displayed information. The storage and display of the previously fed information does not require any energy.

This publication describes several ways how the portable device can be realized which includes a use in the form of bracelet.

The publication describes in detail how a network of devices (people) can be built who have a right to use the system and how to gain access to stored information of a predetermined number of pictures and how a user can choose one or more out of them for downloading and display on the portable device.

The publication is silent about the time required for placing the host and the portable devices in the immediate vicinity of each other so that the information present in the host computer can be sent to the host computer to replace the previously displayed picture (refreshing) and to provide sufficient amount of energy for the portable device required for its operation.

A typical e-ink display is the product of EPSON Type S1D13541 and it has a publicly available Hardware Functional Specification that discloses the need of the display for different voltages when the displayed picture should be refreshed. The refreshment process uses a firmware running on the portable device that uploads the controlling program of the e-ink or electrophoretic display then follows the uploading process stored therein, which uses a timing profile that is included in the algorithm stored in the controlling program of the internal memory of the display device and the timing profile includes waveform files. The waveform file set that is made available by the manufacturer of the display contains refreshing timing and waveform information and conditions for the complete range of the whole range of operating temperature of the display. The associated large set of data has to be uploaded by the control unit of the display each time before a refreshment process takes place which is connected with consumption of energy and time required for carrying out the pre-programmed protocol.

The need of supplying the required energy to the refreshment of the portable device constitutes a further problem as the wireless transfer of the required energy is a slow process, therefore any decrease of the energy required for the refreshment of the displayed image spares the time during which the portable device should be hold closely to the host device. The required energy and time also depend on the amount of data that should be supplied from the host device to the portable device and from the amount of processing steps and data exchange that take place during a refreshment cycle.

From the point of view of energy storage, the limited space in the portable device does not always allow the use of conventional rechargeable batteries, and often the energy can be stored in capacitors. The need of the display for different voltages at refreshment requires the use of a power supply that is capable of providing these separate voltages.

OBJECT OF THE INVENTION

The basic object of the present invention is to provide a method that can reduce the time during which the portable device should be held close to the host device.

SUMMARY OF THE INVENTION

This object can be attained by providing sparing in the amount of information required for the data transfer at refreshing, sparing in the length and complexity and in the energy demand of the internal refreshment process and the limiting of the energy supply to the required level.

Accordingly, a method has been provided for transmitting selected pictorial information present in a host computing device to be displayed on an e-ink type display of a portable device that shows a displayed previous image, comprising the steps of positioning the portable device close to the host device;

establishing between them respective wireless data transfer and energy transfer channels;

forwarding the pictorial information from the host device to the portable device through said data transfer channel and when needed supplying a predetermined amount of energy through the energy transfer channel, further comprising the steps of storing the pictorial information that should replace the previous image in the portable device, dividing a timing profile into a predetermined number of parameter ranges, wherein the timing profile is included in an algorithm stored in a controlling program of the internal memory of the display program required for the change and refreshing of the displayed image wherein the timing profile includes waveform files;

determining the actual parameters in said ranges required for the change and refreshment of the displayed image, uploading that one of said ranges that corresponds to said determined parameters, and based on the uploaded timing profile refreshing the display to show the selected pictorial information.

The division of the timing profile into ranges and using only that single ranges which corresponds to the actual parameters represents a substantial sparing in the preparatory process of the algorithm required for the image refreshment.

In a preferred embodiment the parameters determined include the ambient temperature.

In a preferred embodiment the method further comprises the steps of:

comparing said previous image with the image to be displayed; and establishing a bit map where the two images differ from each other and uploading during said refreshment step only the pictorial information that corresponds to said bit map of the established differences and minimizing thereby the amount of information transfer during said refreshment step.

In this way the data where there is no change between the previously displayed and the updated image need not be forwarded, and this represents a reduction of the required data transfer.

A further preferred embodiment comprises the step of calculating in advance the electrical energy required for carrying out said refreshment step. This is important because if we know the require energy, the energy supply can be terminated when this required amount has been transferred.

In this case it is preferred if prior to said step of determining the required energy for the refreshment, the energy available in a power supply of the portable device is also determined, and the required and measured energy levels are compared with each other, and when the measured energy is less than the required energy, the energy supply channel is activated and energy is supplied from the host device to the portable device at least as long as required for the stored energy to reach said required energy. In this way only the missing energy should be supplied.

A further energy reduction can be attained if during the energy supply process the portable device is switched into a sleeping mode with minimum energy consumption and this mode is periodically terminated for short periods required to carry out said comparison.

The transfer of images at the time of the required refreshment can be spared if a predetermined number of images are stored previously in the memory of the portable device and when refreshment is needed only the address of the selected picture is transmitted.

To ensure correct data and energy transfer the quality of the energy transmission channel is sensed and in case the sensed quality is smaller than a predetermined allowed value, this fact is displayed to the operator and suggests him to try to modify the mutual spatial relationship between the two devices to improve thereby the transmission quality.

The wireless communication channel is preferably an NFC or BLE type channel.

According to the invention an apparatus has also been provided for transmitting a selected new pictorial information present in a host computing device to be displayed on an e-ink type display of a portable device that shows a displayed previous image and comprises a wireless data transfer and energy transfer connection between the host device and the portable device when they are moved close to each other, wherein the portable device comprises a wireless interface unit coupled to the energy transfer connection; an energy storage unit coupled to the wireless interface unit for receiving energy from the energy transfer connection; the data transfer channel is capable of forwarding the pictorial information from the host device to the portable device, and the energy transfer channel is capable of supplying a predetermined amount of energy from the host device to the portable device; the portable unit comprises a control unit having an information storage facility storing the new pictorial information, the control unit comprises furthermore a controlling program required for controlling the change and refreshing of the displayed image in the display, a means for dividing a timing profile included in the controlling program into a predetermined number of parameter ranges, wherein the timing profile includes waveform files; the control unit is additionally capable of determining the actual parameters required for the change of the displayed image, and the control unit chooses that one out of the divided parts of the controlling program which corresponds to the determined parameters, and based on the uploaded timing profile the control unit refreshes the display so that it displays the selected pictorial information.

In a preferred embodiment the energy storage unit comprises energy storage element(s), which are connected to the energy storage unit through respective switches to allow flow of the received energy in selected ones of the energy storage unit.

It is furthermore preferred if the portable device comprises a power supply capable of generating different voltages required for the operation of the display, and the power supply is connected to the energy storage unit.

In a preferred embodiment the actual parameters include the ambient temperature.

LIST OF THE DRAWINGS

The invention will now be described in connection with preferable embodiments thereof, in which reference will be made to the accompanying drawings, wherein FIG. 1 is a sketch illustrating the basic blocks of the apparatus according to the invention;

DESCRIPTION OF THE PREFERRED EMBODIMENTS

Figure 1:
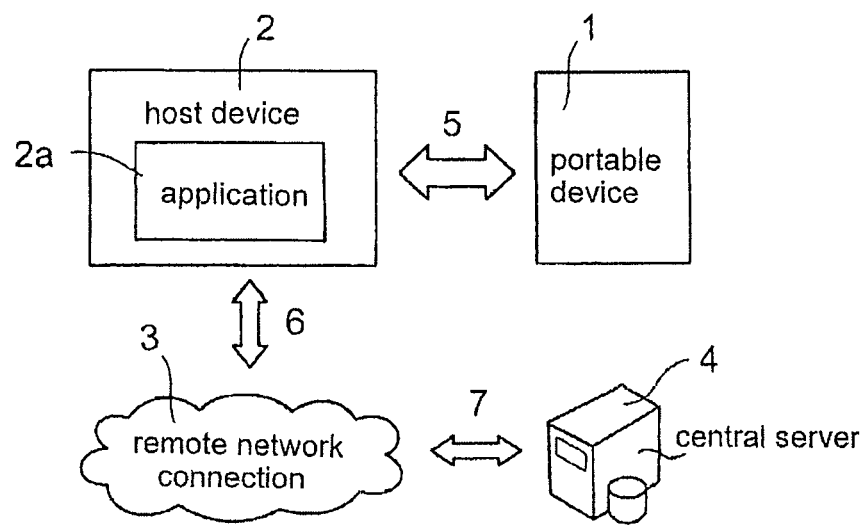

FIG. 1 shows a schematic block diagram of a system having a portable device 1 designed e.g. as a bracelet and comprises an e-ink display. In the system it is possible to upload, store, and download visual information to be displayed remotely on the portable device 1 via a remote network connection 3. The portable device 1 is connected via a wireless channel 5 to a computer or host device 2 of a user in order to transmit from the host device 2 a selected image or graphical information defined by the user. The text or image information to be transferred from the host device 2 can be previously stored in the memory of the device 2. The text or image information to be transferred to the portable device 1 may also be produced locally by the host device 2 however, there is also a possibility to download the text or image information from the memory of a central server 4 to the host device 2 via a remote network connection 6. Obviously, this system also allows the uploading of a text or image information produced by the host device 2 to the central server 4 via the remote network connection 6. In order to provide a communication between the portable and host devices 1 and 2, an application 2a should be used which can be downloaded via the remote network connection 6 (e.g. Internet).

The user can purchase the graphics stored in the central server 4 following a registration through the application 2a. There is a social site on the central server 4 through which users can share their graphics and the site also provides for the uploading of such graphics. This social service may be coupled with an online store function in which case contents of other users can be purchased. In order to purchase a selected graphic from the online store, users must connect to the central server 4 via the internet 6 each time they download a new, not yet purchased graphic. Purchased graphics are constantly synchronized between the host device 2 of the user and the central server 4 by the application 2a installed by the user. In this way the copies of the purchased graphics are saved on the host device 2 of the user; there is no need to purchase said graphics again in case a later use is required. Purchased and saved graphics are properties of the user that can be transferred to any other portable device 1 (e.g. bracelet) at any time by logging in to the private user's account. According to the properties of e-ink displays the portable device 1 shows only the last graphic which has been previously entered therein and this lasts as long as new refreshment is made.

Figure 2:
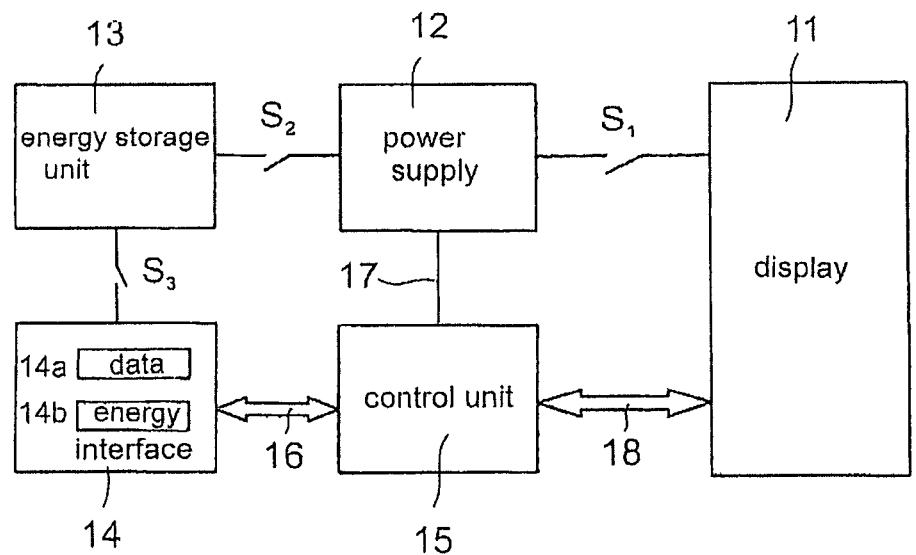
FIG. 2 shows the main blocks of a portable device of a preferred embodiment.

FIG. 2 shows the internal block diagram of the portable device 1 of FIG. 1. The portable device 1 has a modular design, it contains among others: a display 11 (being an e-ink or EPD Electrophoretic display), a power supply 12, an energy storage unit 13, a wireless interface unit 14 and a control unit 15. Of these parts the power supply 12 is connected to the display 11 through a programmable switch $S_1$ and it is connected to the energy storage unit 13 through a different switch $S_2$. The energy storage unit 13 is connected to the wireless interface unit 14 through a programmable switch $S_3$. The display 11 is preferably of e-paper (e-ink) type that only requires energy at the time when refreshment of the displayed picture is done and it stores and displays the previously transmitted graphic without energy consumption. The display 11 may be black and white, greyscale, or colour display. The display 11 receives data through data channels 18 and receives the voltage(s) required for the uploading or changing the graphic (i.e. refreshment) through the switch $S_1$. The data transmission and energy supply functions are carried out by the wireless interface unit 14. The wireless interface unit 14 consists of two subunits: wireless data transmitting module 14a and wireless energy supply module 14b.

The wireless interface unit 14 transmits the data received through a data channel 16 to the control unit 15. The supply and storage of the energy may take place during data transmission, or also independent from it. The wireless interface unit 14 may transmit the supplied energy to the energy storage unit 13 when the switch $S_3$ is turned on. The energy storage unit 13 supplies the power supply 12 when the switch $S_2$ is turned on. The operation of these parts is controlled by the control unit 15. There is a two-way communication between the modules as shown by the arrows in FIG. 2. The respective power supply voltage required for the operation of the different modules is controlled by the switching on and off the switches $S_1$, $S_2$, $S_3$ by the control unit 15. The control unit 15 has an electric circuit containing a microprocessor that has sufficiently high capacity and internal memory in order to store the indispensably required data and program for its operation. These data contain among others the program code for the control of the display module 11, the descriptor (waveform file) containing the timing parameters required for the change of graphic appearing on the display 11, and the data set of the actually displayed graphic on the display.

Figure 3:
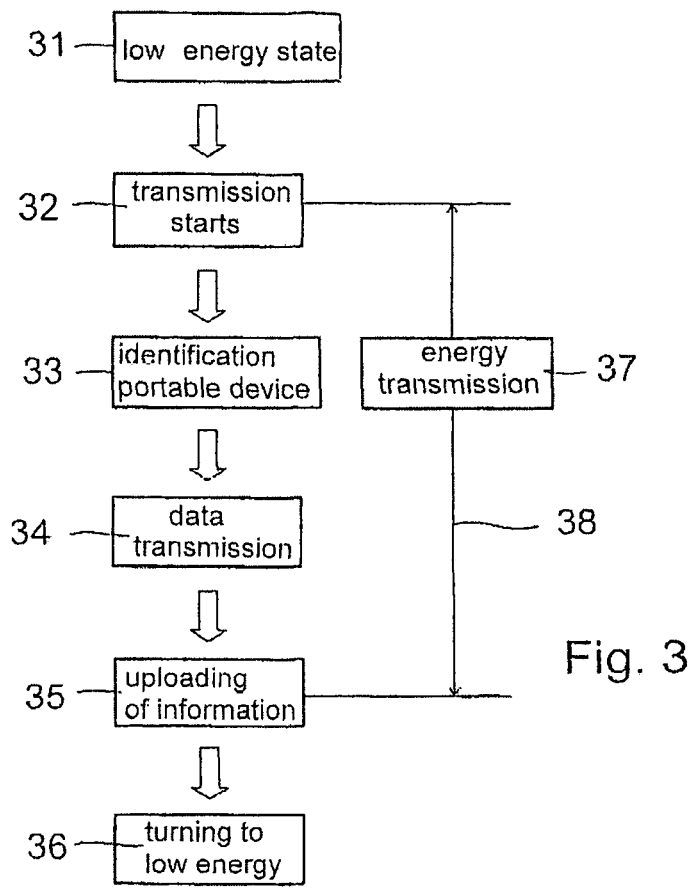
FIG. 3 is a chart showing data and energy transmission of an embodiment.

FIG. 3 shows the process of the data and energy transmission between the host and the portable devices 2 and 1. In step 31 the portable device 1 is switched off, that is to say it is in a very low energy consumption state. In this case the display 11 is either empty (white) or continuously displays the visual information of the previous data transmission (refreshment). In step 32, when the display 11 is moved close to the host device 2 of the user, as well as when the two devices are within the operative range of the wireless communication channel 5, the data transmission and optionally the energy transmission 37 between the portable device 1 and the host device 2 may start. Step 33 shows the identification of the portable device 1. In the course of the identification steps the application software running on the host device checks, whether the portable device 1 has been registered because any further operation is allowed only for registered devices. The application running on the host device 2 determines how many registered portable devices can be served at a time. Beyond checking the registration, the application on the host device may also request the identifier (or code) of the previously downloaded graphic and other operating parameters stored in the portable device 1 (e.g. the type of display, its resolution, operating temperature, etc.). Step 34 shows the actual useful data transmission when the data set of the image information is transmitted. The term "image information" may designate and mean any graphic, pictorial, or textual i.e. visual information.

The application running on the host device 2 processes optional graphics to become with the information and the type and resolution of the display 11, or carries out an appropriate conversion if necessary. Step 35 shows the uploading of the transmitted information to the display 11. In an embodiment of the invention, the uploading or refreshing of the graphic starts only, if the energy required for the refreshment is available in the portable device 1. The energy required for the change of the graphic is calculated based on the details of the graphic (size, content, colour depth, etc.) and on certain environmental parameters (e.g. temperature).

A substantial saving in processing and the associated energy demand can be attained if the refreshment of the displayed image takes place in such a way that only those pixels or positions on the display will be refreshed or changed where the new image differs from the previously displayed image. It is namely unnecessary to load pixels to positions where the previous pixel has already the required value. The calculation where the differences between the new and old images apply can be realized by the control unit 15 upon comparing the two images and the respective bit maps thereof. By uploading only the pixels where the two images differ from each other, the amount of data transfer, time and energy can be spared. The calculation of the energy required for the image refreshment takes into account this reduced amount of data to be transferred. The overlapping between the previous and new images can vary from case to case but it can reach over 90% and can be as low as 10%, in average it is around 60%.

In case the required energy is not available in the energy storage unit, then only energy transmission (supply) takes place. If and when the required energy for the graphic uploading is available, the graphic uploading or refreshing cycle can be started. Following the completion of the graphic uploading or refreshing, the energy transmission may be finished. In the following step 36, the portable device is turned again into an extraordinarily low energy consumption mode, e.g. into a switched off state. However, the uploaded or refreshed graphic is continuously displayed.

During data transmission, in case of successful verification of the received packages, the control unit 15 sends an acknowledgement message. In case the data get corrupted during the data transmission, the control unit 15 sends a message requesting the repeated transmission to the users' application 2a. All messages from the portable device 1 (e.g. bracelet) contain information on the conditions of the portable device 1. Among other things, this is information comprises an indication of the quality of the connection which is calculated by the control unit 15 based on the temporary changes of the amount of the energy in the storage unit. Based on this, the quality of the connection can be described, and applying this information the application program 2a can provide suggestions for the user on the need of changing the relative orientation and position of the devices 1 and 2 in order to improve the efficiency of the connection, hence achieving the reduction of the time required for the data transfer.

Following a successful data transfer, the control unit 15 processes the information received, estimates the quantity of energy required for a safe refreshment of the graphic to be displayed based on an appropriate algorithm stored in its programming code, and subsequently, based on the amount of energy received during the data transfer it determines whether there is a need for the supply of more energy. If this is the case, the control unit 15 places itself in the lowest possible energy consumption state, e.g. sleeping mode and periodically it returns to the normal mode to be able to check the amount of the energy stored in the energy storage unit 13.

In case the stored energy is sufficient, the refreshment of the graphic on the display 11 of the device 1 might be started.

As described earlier the e-paper display 11 requires energy only at the time of the change of the graphic on the screen and it does not require energy for upholding the displayed graphic.

Figure 6:
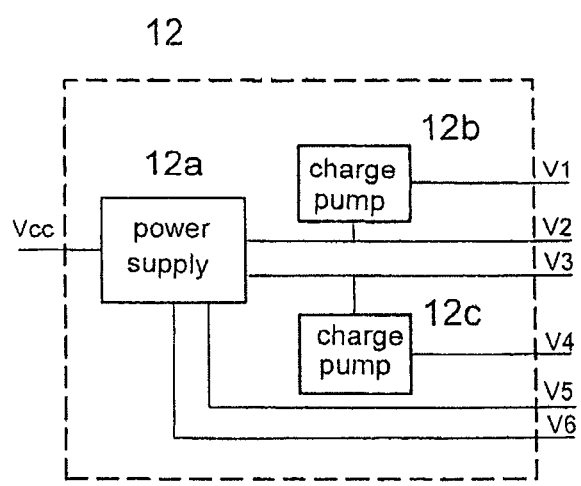
FIG. 6 is a block diagram of the power supply of the portable device.

In order to carry out the refreshment, the firmware running on the portable device 1 uploads the controlling programme from its internal memory to the Electrophoretic Display (EPD) 11 then the process is continued by the uploading of the descriptor (waveform file) data set that contains the timing data for the change of the displayed image. Generally, this waveform file is made available by the manufacturer of the display device that contains refreshing timings and waveform for the complete range of the allowed operating temperature of the display, taking into account the greyscale level, namely the timing profiles of the graphic to be changed. This relatively large set of data has to be uploaded by the control unit of the display each time before the change or refreshment of the graphic following the start of the refreshment operation. Then the appropriate timing profile is chosen in accordance with its own algorithm. The transmission of this data set is by and large redundant and energy wasting as in accordance with the actual current environmental parameters only a small fraction of the waveform file is used for the refreshment of the display module 11. In order to do this, the waveform file can be divided based on a determined number of ranges of the operating parameters and taking into account the above parameters, the control unit 15 only uploads that timing profile which is required for the refreshment with the actually existing and determined operating parameters. The size of the individual timing profile resulting in this way is approximately 1/20 of the size of the original waveform file, thus by using this simplification method time and energy is saved which results in a shorter refreshing process. On uploading the timing profile, the transmission of the data of the graphic from the memory of the central storage unit to the display module 11 takes place and the refreshing of the display starts. To do this, it is indispensable to provide the respective power supply voltages that the display 11 requires. By switching on the switch $S_2$, the control unit 15 releases the stored energy to the input of the highly efficient combined power supply 12 that generates the indispensably required voltages for putting into operation the EPD display 11. In order to improve efficiency, the power supply 12 consists of a combination of several different types of power supplies as shown in FIG. 6. From a voltage HO connected to the input of the switch mode power supply unit 12a the unit 12a generates under the control of the control unit 15 different voltages that follow the order of the timing defined in the specification of the display module 11, and these voltages include three positive and one negative voltages $V_2$, $V_3$, $V_5$, $V_6$, furthermore the power supply unit 12a generates from the voltages $V_2$, $V_3$ through respective charge pumps 12b and 12c two additional voltages which are higher than the voltages $V_2$, $V_3$. As soon as all the required supply voltages have been generated and are available, the display 11 will be refreshed and the new image appears.

Following the displaying of the new graphic, the central control unit sends a message on the successful refreshment to the users' application 2a then places itself in the energy saving mode, then the recharging of the energy storage unit 13b until will start and lasts till the interruption of the NFC connection. The purpose of such a supply lies in that the energy storage unit should receive the most possible energy to be able cover the energy requirements of possible frequent refreshments, whereby shorter transmission times will be attained. The stored energy can be used for periodic image refreshment, or to the refreshment of only certain parts of the display. This may take place in a pre-programmed way, or automatically following the habits of the user (e.g. for sport movement pattern observations and visualization of activity details).

Figure 4:
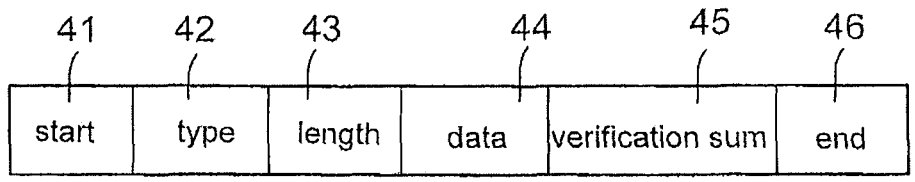
FIG. 4 shows the structure of the transmitted data.

The data transfer process takes place in accordance with a predetermined protocol that consists of acknowledgement packets. A possible application of the protocol to be used is shown in FIG. 4. It is a characteristic to the protocol that all packages have a starting symbol 41, an ending symbol 46, and in between a field for identifying the type of package 42, a package length field 43, a data block 44 and a verification sum of the package 45 for avoiding possible corruptions of the package during the transmission. Taking into account future developments the protocol supports interpretation of packages embedded in the data block of the package, hence the structure remains easily modifiable.

Figure 5:
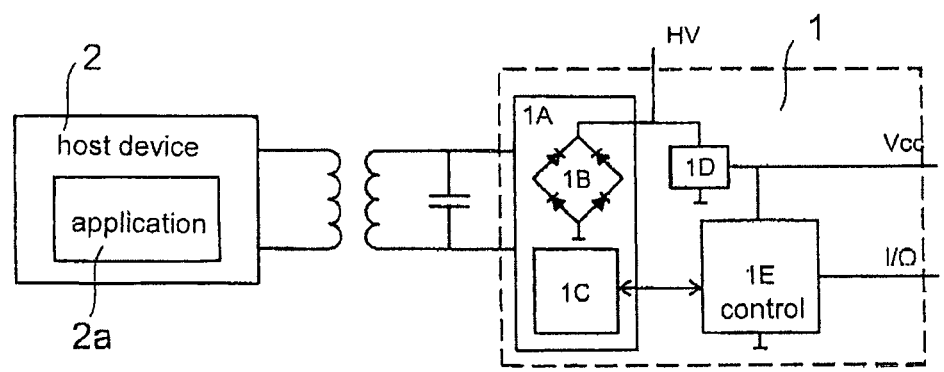
FIG. 5 shows the circuit design of an embodiment used for data and energy transmission.

FIG. 5 shows a wireless data and energy transmission connection between the host device 2 and the portable device 1 of the user. As it can be clearly seen in the drawing, the host device 2 and the portable device 1 come into an inductively coupled state through the inductive element (antenna) belonging to the wireless interface as soon as the two devices come sufficiently close to each other. The maximum distance for successful data and energy transmission is determined by the applied wireless technology. In case of NFC technology, the maximum distance is 1-2 cm, and in case of BLE it may be up to 1 m. However in case of applying NFC, it is preferable to position the inductive parts of the two devices as close as possible, which for example can be achieved by positioning the two devices to contact each other. In order to further improve the effect, the two devices should be positioned in such a way to touch each other so that their inductive elements get as close to each other as possible. This position and any deviation from this position can be determined by the application running on the host device and can be signalled towards the user. Data transmitted by the host device 2 and received by the portable device 1 are transformed by a modulator/demodulator unit 1C which is located in the analogue front end AFE unit 1A of the portable device 1 and they are transmitted to the control unit 1E. The energy of the high-frequency signals received during the transmission is rectified by a rectifier 1B, and the LDO unit 1D converts it to a regulated DC voltage.

The inductance parts are set on the standard NFC frequency of 13.46 MHz and the part in the portable device 1 it is connected to an analogue front end unit 1A. The data and energy transmissions take place through the inductive coupling of the inductors in the devices 1 and 2. The received signal flows to a bridge rectifier 1B using diodes and this delivers a DC voltage and the value of the voltage depends on the field strength HV around the inductive element. The inductive element is also connected to a block 1C that facilitates data transmission and which carries out modulation/demodulation of the signals in accordance with the NFC standard and two-way communication. The energy made available at the point HV can be used by the further units and it also ensures the power supply of the internal digital processing unit (control unit) 1E through a linear low drop out voltage regulator (LDO) 1D. The digital processing unit 1E carries out the conversion of the signals determined by the NFC standard and the buffering of such signals towards the outside world through the periphery I/O.

FIG. 6 shows schematically the block diagram of the power supply 12 producing the required power supply voltages for the operation of the portable device 1 from a received input voltage Vcc. As the operation of the e-ink type display 11 requires a predetermined number of different voltages, the power supply 12 contains a switch mode power supply 12a and charge pump electric circuits 12b and 12c. With this configuration the power supply 12 generates six different output voltages $V_1$-$V_6$ from the input voltage Vcc.

Figure 7:
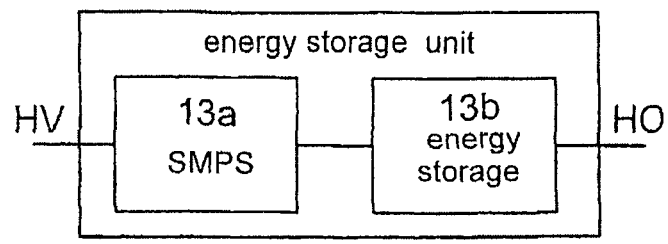
FIG. 7 is a block diagram of the energy storage unit of the portable device.

In case of an implementation with NFC communication, an energy storage unit 13 shown in FIG. 7 can be divided into two main parts. The first part is the high efficiency SMPS Switched Mode Power Supply 13a which transforms and boosts the voltage HV received at the input to its multiple values. The magnitude of the voltage HV and the recoverable electric current change dynamically thus the amount of recoverable energy is greatly dependent on the quality of the connection. Such quality parameter is primarily determined by the relative distance, position, and orientation of the two devices 1 and 2 of the connection. The main characteristic of the power supply is that regardless of the changing circumstances in order to recover the most energy it uses a high efficiency switch mode power supply which is based on the so-called MPPC (Maximum Power Point Control) technology that is generally applied in case of high output impedance power supplies (e.g. photovoltaic cells). This is accomplished by the power supply unit 13a controlling current collection in a way that the input voltage does not fall below a predetermined value, this way the highest electric current can be recovered at a given voltage level. The switch mode power supply unit 13a uses this input energy in order to store energy in an energy storage unit 13b. The practical implementation of the power supply can be based on inductor (e.g. step up converter), or solely using condensers—so-called pump charge based.

Figure 8:
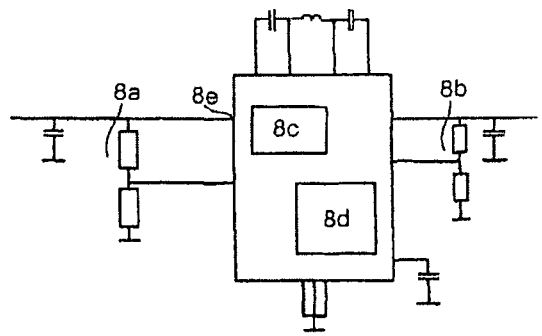
FIG. 8 shows schematically the switch mode power supply of the portable device.
Figure 9:
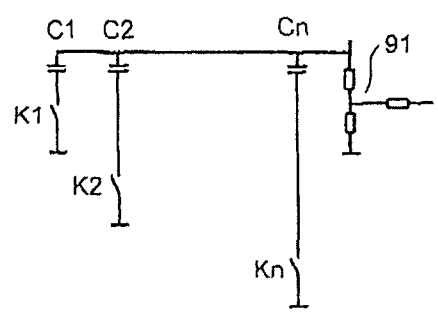
FIG. 9 is a schematic illustration of the energy storage unit of the portable device.

A possible configuration of an arrangement of the switch mode power supply 13a is shown in FIG. 8. The required voltage for control unit 8d that controls the power supply unit is generated from the power supply voltage at the input of power supply unit 8e by an LDO 8c. In order to maintain a required minimum level of the power supply input voltage, a voltage divider circuit 8a is applied for providing a control signal for the control unit 8d which on the basis of this control signal is capable of controlling the operation of the DC-DC converter in a way that it maximizes the recovered electric current during its operation subject to the available energy at its input (e.g. average current mode control, peak current mode control, etc.). For adjusting the output voltage to a certain level a further voltage divider circuit 8b can be applied.

In case of NFC implementation, the output of the switch mode power supply unit 13a is connected directly to the input of the energy storage unit 13b which consists of multiple storage elements or cells connected in parallel that can be operated separately by the control unit 15, thus allowing the modification of storage capacity of the storage unit 13b and ensuring that only the amount of the energy required for the change or refreshment of the graphic to be displayed be stored. Capacitors $C_1$-$C_n$ can be super capacitors, lithium capacitors, etc. can be used here as energy storage cells. The energy storage cells are connected in parallel and can be separately switched in steps by switches $K_1$-$K_n$ which switches are typically realized by transistors. When a switch is switched off then the corresponding energy storage cell will not take part in storing energy. This makes it possible to dynamically change the capacity of the energy storage unit, subject to the required energy. The control unit 15 receives feedback on the cumulated energy stored in the energy storage unit through a voltage divider circuit 91.

The required refreshment energy for the change of the graphic on the display is determined by the control unit 15 taking into account different parameters. Such parameters are the type of the graphic on the display, the new graphic to be displayed, its colour range (black and white or grey-scale), etc. A precise feedback is sent by a voltage divider to the control unit 15 on the energy level of the energy storage cells and based on that the control unit 15 determines whether sufficient energy has been accumulated for the change of the graphic on the display 11.

In case the wireless communication channel is implemented by BLE technology instead of NFC, the energy storage module 13 can be designed by a rechargeable battery the charging of which may be regulated by the wireless interface unit 14.

Figure 10:
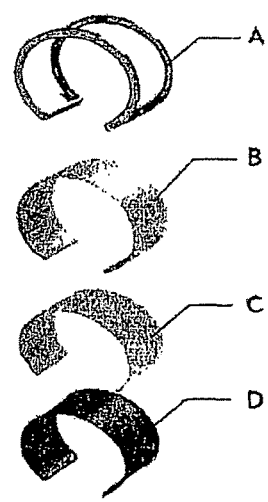
FIG. 10 is an exploded view of the portable device of a preferred embodiment designed as a bracelet.

FIG. 10 shows—in an exploded axonometric view—the structure of the portable device 1 designed as a bracelet which has dynamically modifiable visual display properties. The bracelet has a metal framework that structurally can be made as a single part, or can be composed of multiple parts fitted together. In the latter case the metal parts are attached to a plastic carrier frame. The carrier frame is preferably configured in such a way that it contains the integrated electronics C and the bendable or curved display B which is positioned to the frame A, and the electronics C is covered by a sealing back sheet D. The required electronics for the operation of the bracelet may be mounted on a flexible printed circuit board which is configured to contain the integral components required for the display, thus it is utilized at the time of manufacturing the display B and becomes its inseparable part.

Figure 11:
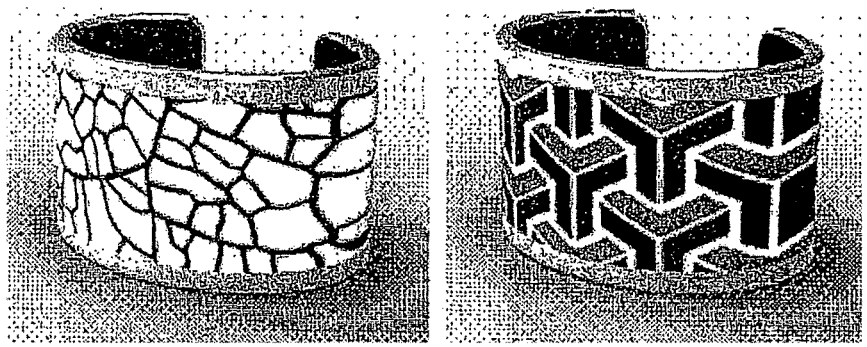
FIG. 11 shows the perspective view of the bracelets displaying two different images.

Finally, FIG. 11 shows an example of the portable device 1 when designed as a bracelet, when the display B shows two visually different graphics.

The invention has been described in detail according to the embodiments shown in the drawings; this however does not mean that the invention is restricted to these exemplary embodiments. As it may be apparent to those skilled in the art, there are numerous other variations and combinations of use within the scope of the attached claims. For example the computing or host device 2 of the user can be any device capable of establishing remote, local or wireless network connection, e.g. PC, NFC writer, etc.

The invention claimed is:

1. A method for transmitting selected pictorial information present in a host computing device to be displayed on an e-ink type display of a portable device that shows a displayed previous image, comprising the steps of
    positioning the portable device close to the host device;
    establishing between them respective wireless data transfer and energy transfer channels;
    forwarding the pictorial information from the host device to the portable device through the data transfer channel and when needed
    supplying a predetermined amount of energy through the energy transfer channel, further comprising the steps of
    storing the pictorial information that should replace the previous image in the portable device,
    dividing a timing profile into a predetermined number of parameter ranges, wherein the timing profile is included in an algorithm stored in a controlling program of the internal memory of the display program required for the change and refreshing of the displayed image wherein the timing profile includes waveform files;
    determining the actual parameters in the ranges required for the change and refreshment of the displayed image,
    uploading that one of the ranges that corresponds to the determined parameters, and based on the uploaded timing profile
    refreshing the display to show the selected pictorial information.

2. The method as claimed in claim 1, wherein the determined parameters include the ambient temperature.

3. The method as claimed in claim 2, further comprising the steps of:
    comparing the previous image with the image to be displayed; and
    establishing a bit map where the two images differ from each other and
    uploading during the refreshment step only the pictorial information that corresponds to the bit map of the established differences and minimizing thereby the amount of information transfer during the refreshment step.

4. The method as claimed in claim 2, further comprising the step of:
    calculating in advance the electrical energy required for carrying out the refreshment step.

5. The method as claimed in claim 4, comprising the step of prior to the refreshment step determining the energy available in a power supply of the portable device and comparing the required and measured energies and when the measured energy is less than the required energy, activating the energy supply channel and supplying energy from the host device at least as long as required for the stored energy to reach the required energy.

6. The method as claimed in claim 5, wherein during the energy supply process switching the portable device into a sleeping mode with minimum energy consumption and periodically terminating the sleeping mode for short periods required to carry out the comparison.

7. The method as claimed in claim 1, wherein previously storing a predetermined number of images in the memory of the portable device and the forwarding step of the pictorial information to be displayed includes the transmission of an address of the selected picture in the memory of the portable device.

8. The method as claimed in claim 1, wherein sensing the quality of the energy transmission channel and in case the sensed quality is smaller than a predetermined allowed value, displaying this fact to the operator and suggesting to try to modify the mutual spatial relationship between the two devices to improve thereby the transmission quality.

9. The method as claimed in claim 1, wherein the wireless communication channel is a communication channel based on NFC or BLE standard.

10. Apparatus for transmitting a selected new pictorial information present in a host computing device to be displayed on an e-ink type display of a portable device that shows a displayed previous image, comprising a wireless data transfer and energy transfer connection between the host device and the portable device when they are moved close to each other, wherein the portable device comprises a wireless interface unit coupled to the energy transfer connection; an energy storage unit coupled to the wireless interface unit for receiving energy from the energy transfer connection; the data transfer channel is capable of forwarding the pictorial information from the host device to the portable device, and the energy transfer channel is capable of supplying a predetermined amount of energy from the host device to the portable device; the portable unit comprises a control unit having an information storage facility storing the new pictorial information, the control unit comprises furthermore a controlling program required for controlling the change and refreshing of the displayed image in the display, a means for dividing a timing profile included in the controlling program into a predetermined number of parameter ranges, wherein the timing profile includes waveform files; the control unit is additionally capable of determining the actual parameters required for the change of the displayed image, and the control unit chooses that one out of the divided parts of the controlling program which corresponds to the determined parameters, and based on the uploaded timing profile the control unit refreshes the display so that it displays the selected pictorial information.

11. The apparatus as claimed in claim 10, wherein the energy storage unit comprises energy storage element(s), which are connected to the energy storage unit through respective switches to allow flow of the received energy in selected ones of the energy storage unit.

12. The apparatus as claimed in claim 11, wherein the portable device comprises a power supply capable of generating different voltages required for the operation of the display, the power supply is connected to the energy storage unit.

13. The apparatus as claimed in claim 10, wherein the actual parameters include the ambient temperature.

14. The apparatus as claimed in claim 10, wherein the portable device is designed as a bracelet wherein the display takes the most of the outer surface thereof.

* * * * *